United States Patent
Tanaka et al.

(10) Patent No.: US 12,170,580 B2
(45) Date of Patent: Dec. 17, 2024

(54) MEETING ASSIST PROCESS FOR EFFICIENT MEETING MANAGEMENT

(71) Applicants: Shun Tanaka, Parsippany, NJ (US); Jayasimha Nuggehalli, Cupertino, CA (US); Toshiya Watanabe, Fort Lee, NJ (US)

(72) Inventors: Shun Tanaka, Parsippany, NJ (US); Jayasimha Nuggehalli, Cupertino, CA (US); Toshiya Watanabe, Fort Lee, NJ (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/118,358

(22) Filed: Mar. 7, 2023

(65) Prior Publication Data

US 2024/0305492 A1    Sep. 12, 2024

(51) Int. Cl.
*H04L 12/18*  (2006.01)

(52) U.S. Cl.
CPC ...... *H04L 12/1831* (2013.01); *H04L 12/1818* (2013.01)

(58) Field of Classification Search
CPC .......... H04L 12/1831; H04L 12/1818
See application file for complete search history.

(56) References Cited

U.S. PATENT DOCUMENTS

| | | | |
|---|---|---|---|
| 9,654,521 B2 * | 5/2017 | West | H04M 3/42221 |
| 9,893,905 B2 * | 2/2018 | Donneau-Golencer | H04L 12/1886 |
| 10,268,990 B2 * | 4/2019 | Kitada | H04N 7/152 |
| 10,547,464 B2 * | 1/2020 | Palan | H04L 12/1831 |
| 11,042,596 B2 * | 6/2021 | Goenka | G11B 27/34 |
| 11,087,251 B2 * | 8/2021 | Peck | G06Q 10/063116 |
| 11,227,263 B2 * | 1/2022 | Lagares-Greenblatt | G06Q 10/1095 |
| 11,689,379 B2 * | 6/2023 | Daredia | G06F 16/483 709/204 |
| 11,756,003 B2 * | 9/2023 | Øhrn | G06Q 10/1095 705/7.19 |
| 2022/0329555 A1 * | 10/2022 | Xu | G06F 40/30 |
| 2023/0080660 A1 * | 3/2023 | Miletic | G10L 15/063 382/103 |

(Continued)

*Primary Examiner* — Nazia Naoreen
(74) *Attorney, Agent, or Firm* — Hickman Becker Bingham Ledesma LLP (57) ABSTRACT

An approach is provided for a meeting assist process to receive, over one or more communications networks, a meeting request for meeting assistance, the request including meeting background information, the meeting assist process instantiating an information gathering module to automatically parse the background information to form one or more queries for collecting data across a plurality of data sources, query a plurality of data sources to gather information, and distribute the gathered information automatically to predetermined locations. The meeting assist process further instantiates a meeting artificial intelligence module to monitor the meeting and apply artificial intelligence to automatically detect and track meeting progress, and automatically instantiates a summarization artificial intelligence module upon the meeting ending to generate a meeting analysis including at least a post-meeting summary and sentiment analysis, and automatically distributes the meeting analysis to a shared repository database or a predetermined email list.

19 Claims, 8 Drawing Sheets

(56) References Cited

U.S. PATENT DOCUMENTS

2023/0403174 A1* 12/2023 Mohanty ............ H04L 12/1831

* cited by examiner

MEETING ASSIST PROCESS FOR EFFICIENT MEETING MANAGEMENT

FIELD OF THE INVENTION

This invention relates generally to meeting assistance systems, and more specifically, to an approach for an end to end meeting assistance system.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

A meeting is typically an effective vehicle for coordinating the successful accomplishment of a common goal shared by multiple people. However, a meeting can also be an inefficient use of time in the absence of proper preparation. Transcribing the meeting, analyzing meeting participation, and tedious follow-up actions are often neglected after the meeting. A successful meeting requires attendance of well-prepared attendees with proper prior information as well as post meeting data.

Unfortunately, there are no automated systems that ensure efficiency in meeting preparation, meeting management, as well as post-meeting analysis data. Current solutions fail to automate activities efficiently in that known solutions fail to provide an end-to-end solution that provides and disseminates data and associated information and activities both prior to a meeting, during a meeting and after a meeting. Based on the foregoing, there is a need for an approach for a solution that does not suffer from limitations of prior approaches. There is a particular need for an approach that automates meeting management and analysis. There is a further need for an approach that automates pre-meeting, meeting as well as post-meeting data management for an end-to-end solution.

SUMMARY

One or more embodiments is directed to an apparatus executing a meeting assist process to receive, over one or more communications networks, a meeting request for meeting assistance, the request including meeting background information; the meeting assist process executing on the apparatus to instantiate an information gathering module to automatically parse the background information to form one or more queries for collecting data across a plurality of data sources; query a plurality of data sources to gather information; and distribute the gathered information automatically to predetermined locations.

The meeting assist process further executes on the apparatus to instantiate a meeting artificial intelligence module to monitor the meeting and apply artificial intelligence to automatically detect meeting progress and maintain meeting progress, automatically instantiate a summarization artificial intelligence module upon the meeting ending to generate a meeting analysis including at least a post-meeting summary and sentiment analysis, and automatically distribute the meeting analysis to a shared repository database or a predetermined email list.

The approach may also be implemented by one or more non-transitory computer-readable media storing instructions which, when processed by one or more processors, causes the functionality to be performed. The approach may also be implemented by one or more computer-implemented methods.

BRIEF DESCRIPTION OF THE DRAWINGS

In the figures of the accompanying drawings like reference numerals refer to similar elements.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ARCHITECTURE
III. MEETING ASSIST PROCESS
III IMPLEMENTATION MECHANISMS

I. Overview

An approach is provided for an end-to-end meeting assist process that receives a meeting request for meeting assistance, the request including meeting background information, instantiates an information gathering module to automatically parse the background information to form one or more queries for collecting data across a plurality of data sources, query a plurality of data sources to gather information, and distribute the gathered information automatically to predetermined locations. The meeting assist process further instantiates a meeting artificial intelligence module to monitor the meeting and apply artificial intelligence to automatically detect and track meeting progress, and automatically instantiates a summarization artificial intelligence module upon the meeting ending to generate a meeting analysis including at least a post-meeting summary and sentiment analysis, and automatically distributes the meeting analysis to a shared repository database and a predetermined email list.

II. Architecture

Figure 1A:
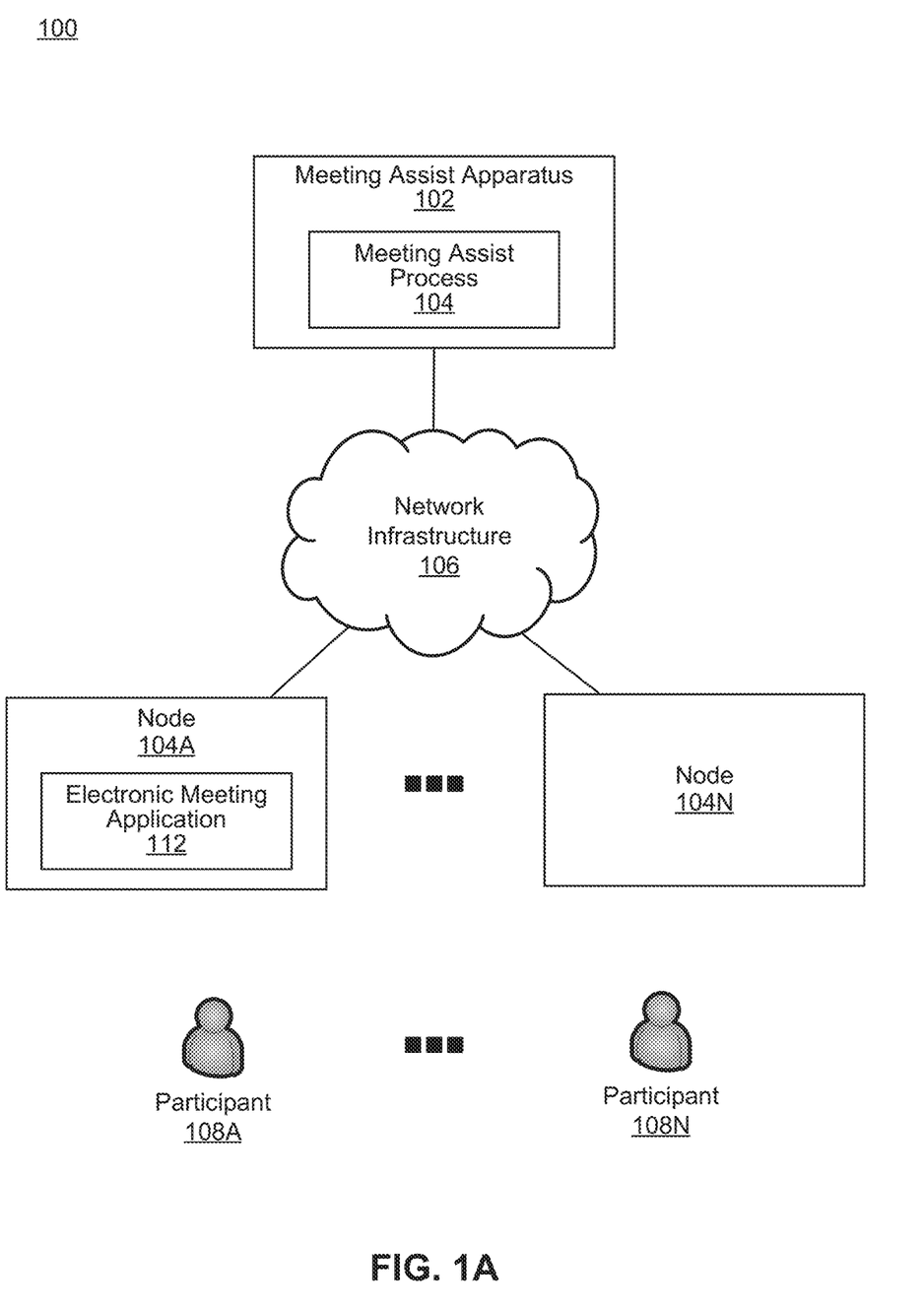
FIG. 1A-1C are block diagrams that depict an architecture for according to an embodiment of the invention.
Figure 1B:
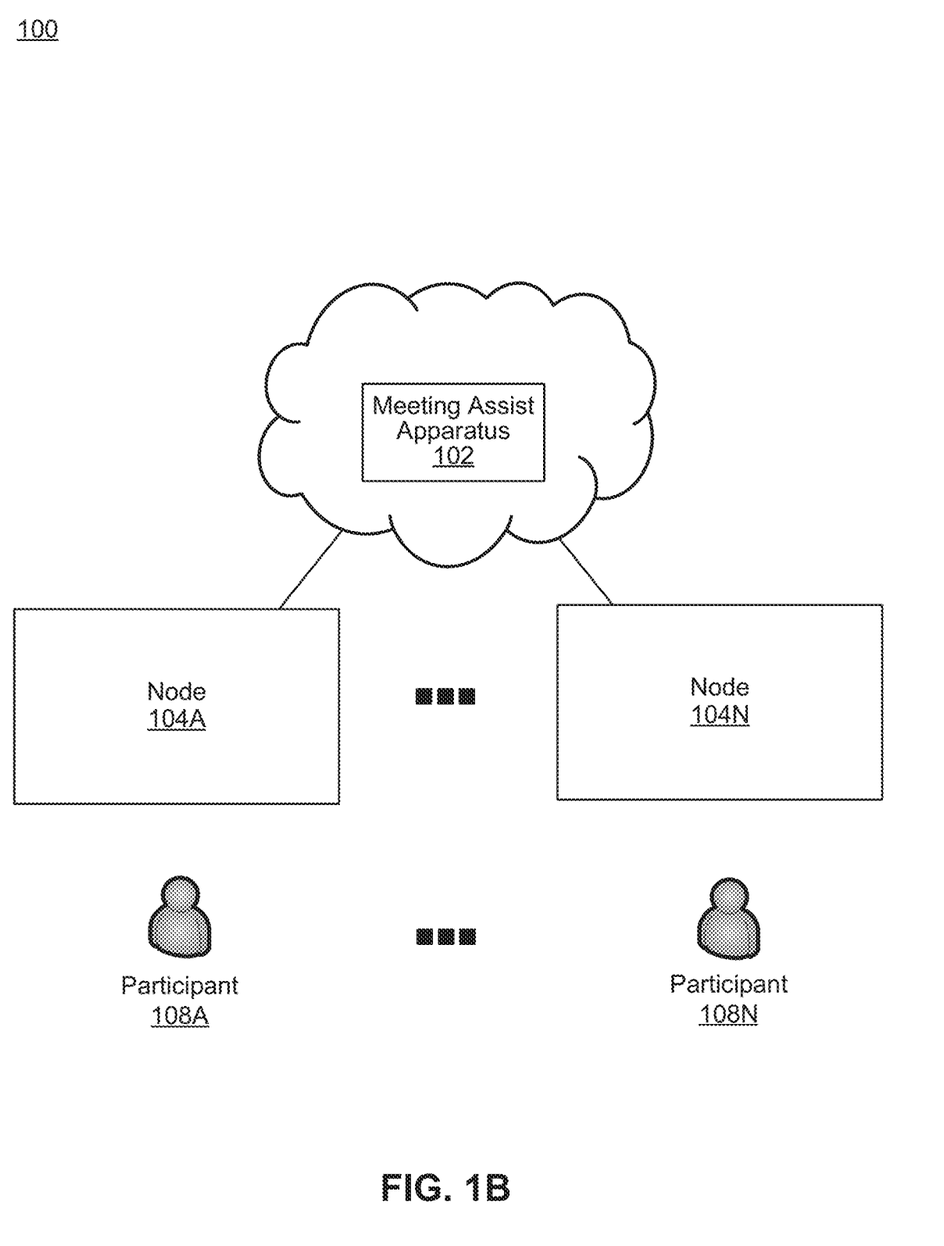
Figure 1C:
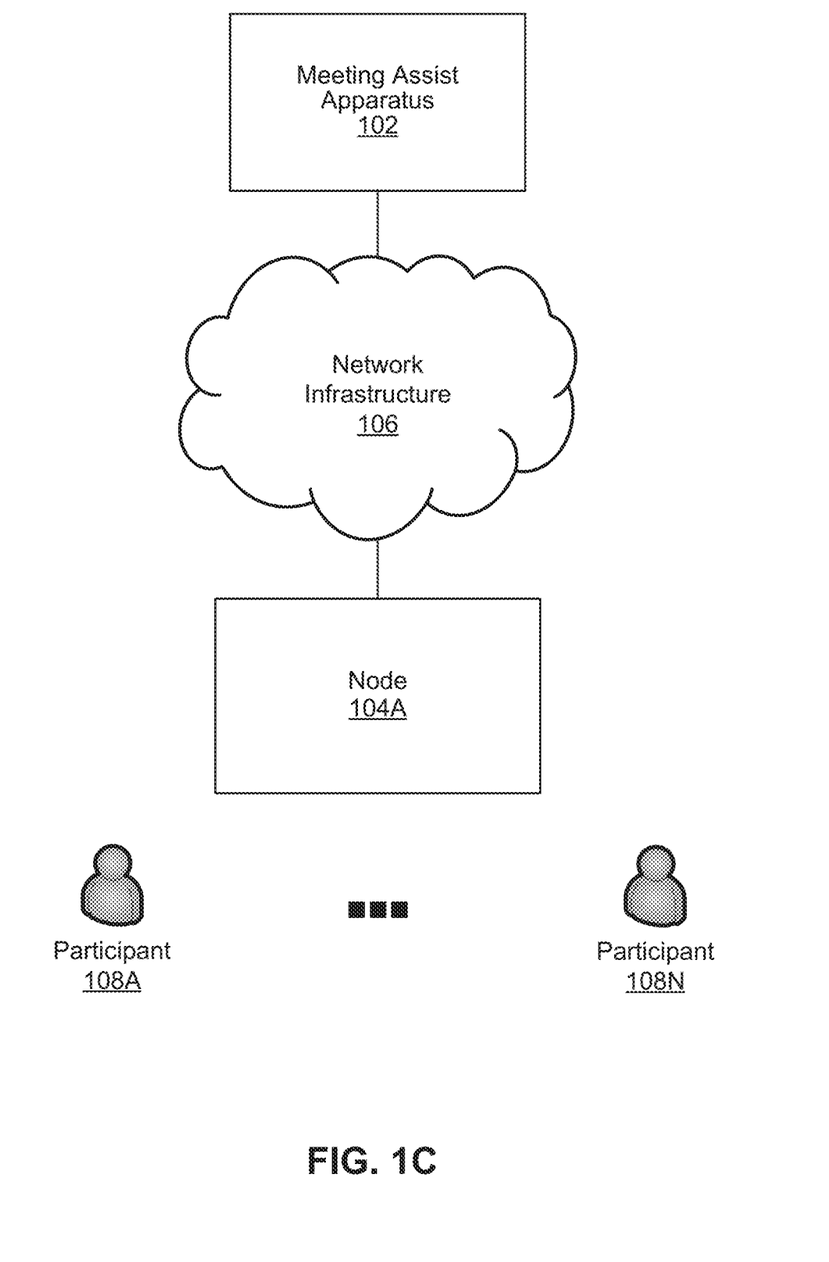

FIGS. 1A-C depict example computer architectures upon which embodiments may be implemented. FIGS. 1A-C include various examples of an arrangement 100 that supports electronic meetings. Arrangement 100 includes a meeting assist apparatus 102 which includes a meeting assist process 104, and one or more nodes 104A-N, communicatively coupled via network infrastructure 106. Nodes 104A-N are associated with a plurality of electronic meeting participants 108A-N, also referred to herein as "participants." Some elements depicted in FIG. 1A are not depicted in other figures for purposes of explanation, but these elements may be included in the elements of the other figures.

Electronic meetings supported by arrangement 100 may be any type of electronic meetings conducted in any form using any computing platform represented by electronic meeting application 112. Examples of electronic meetings include, without limitation, audioconferencing sessions, videoconferencing sessions, desktop sharing sessions, any combination of the foregoing, and/or any other electronic meetings involving the sharing of data between network infrastructure 106 and at least one node 104A. Participants 108A-N may be located in physically-disparate locations or co-located in the same physical location. For example, FIGS. 1A-B depict arrangement 100 in which participants 108A-N are located in different physical locations yet participate in an electronic meeting via network infrastructure 106. FIG. 1C depicts arrangement 100 in which participants 108A-N are located in physical proximity to each other such that they may communicate with each other without network infrastructure 106. However, network infrastructure 106 may enable participants 108A-N to interact with meeting assist apparatus 102, which receives input data from and/or sends output data to node 104A. Embodiments are also applicable to electronic meetings in which some participants 108A-N are in physically-disparate locations and some are co-located at the same physical location.

In an embodiment, arrangement 100 involves a network of computers. A "computer" may be one or more physical computers, virtual computers, and/or computing devices. A computer may be a client and/or a server. Any reference to "a computer" herein may mean one or more computers, unless expressly stated otherwise. Each of the logical and/or functional units depicted in any of the figures or described herein may be implemented using any of the techniques further described herein in connection with FIG. 6.

Meeting assist apparatus 102 may access meeting content data as if it were a node associated with a participant in an electronic meeting. Thus, meeting assist apparatus 102 may access any meeting content data that is transmitted from any of the one or more nodes 104A-N involved in an electronic meeting.

Meeting assist apparatus 102 may be located at a number of different locations relative to network infrastructure 106. Referring to FIGS. 1A and 1C, meeting assist apparatus 102 is located outside network infrastructure 106. Referring to FIG. 1B, meeting assist apparatus 102 is collocated with at least some of network infrastructure 106. Meeting assist process 104 may include one or more application program interfaces (APIs) that may be used by electronic meeting applications 112 such as to access functionality provided by modules within meeting assist process 104 described below.

In an embodiment, meeting assist apparatus 102 is communicatively coupled to any of a number of external data sources (not shown), such as websites, other data available via the World Wide Web, databases managed by Salesforce, Oracle, SAP, or any entity other than the entity managing meeting assist apparatus 102. Meeting assist apparatus 102 may be communicatively coupled to the external data sources via network infrastructure 106. The external data sources may provide meeting intelligence apparatus 102 with access to any of a variety of data, meeting-related or otherwise.

Network infrastructure 106 may include any number and type of wired or wireless networks, such as local area networks (LANs), wide area networks (WANs), the Internet, etc. Network infrastructure 106 may also include one or more computing devices, such as one or more server computers, load-balancing computers, cloud-based computers, data centers, storage devices, and/or any other special-purpose computing devices. For example, network infrastructure 106 may include a Unified Communication System (UCS) Service Platform by Ricoh Company Ltd., and/or any other computer(s) that manage(s) electronic meetings.

Each node of the one or more nodes 104A-N is associated with one or more participants 108A-N. Each participant is a person who participates in an electronic meeting. Each node processes data transmission between network infrastructure 106 and at least one participant. Multiple nodes 104A-N may be communicatively coupled with each other using any of a number of different configurations. For example, multiple nodes may be communicatively coupled with each other via a centralized server or via a peer-to-peer network.

In an embodiment, a node includes a computing device that executes an electronic meeting application 112. As used herein, the term "application" refers to any type of process. The node may include a special-purpose computing, such as Ricoh UCS P3500, or a general-purpose computer that executes a special-purpose application, such as Ricoh UCS App. The node may also include any of a number of input/output mechanisms, such as a camera, a microphone, and an electronic whiteboard. For example, the node may include a smartphone with GPS capability, a camera, a microphone, an accelerometer, a touchscreen, etc. Example implementations of a node include, without limitation, a desktop computer, a laptop computer, a workstation, a tablet computing device, a personal digital assistant, an interactive whiteboard (IWB) appliance, a mobile phone, or other mobile computing device. The input/output mechanisms may include a participant interface, such as a graphical user interface (GUI). Electronic meeting applications may create and manage data that supports electronic meetings, and the data may be stored locally on nodes 104A-N, or remotely, depending upon a particular implementation. Electronic meeting application 112 is implemented by one or more processes that allow a corresponding node/participant to participate in electronic meetings. Electronic meeting application 112 is configured to interact with one or more other electronic meeting applications on other computing devices and/or one or more electronic meeting organizers or servers to participate in electronic meetings into various aspects of electronic meetings, as described in more detail hereinafter.

III. Meeting Assist Process

Figure 2:
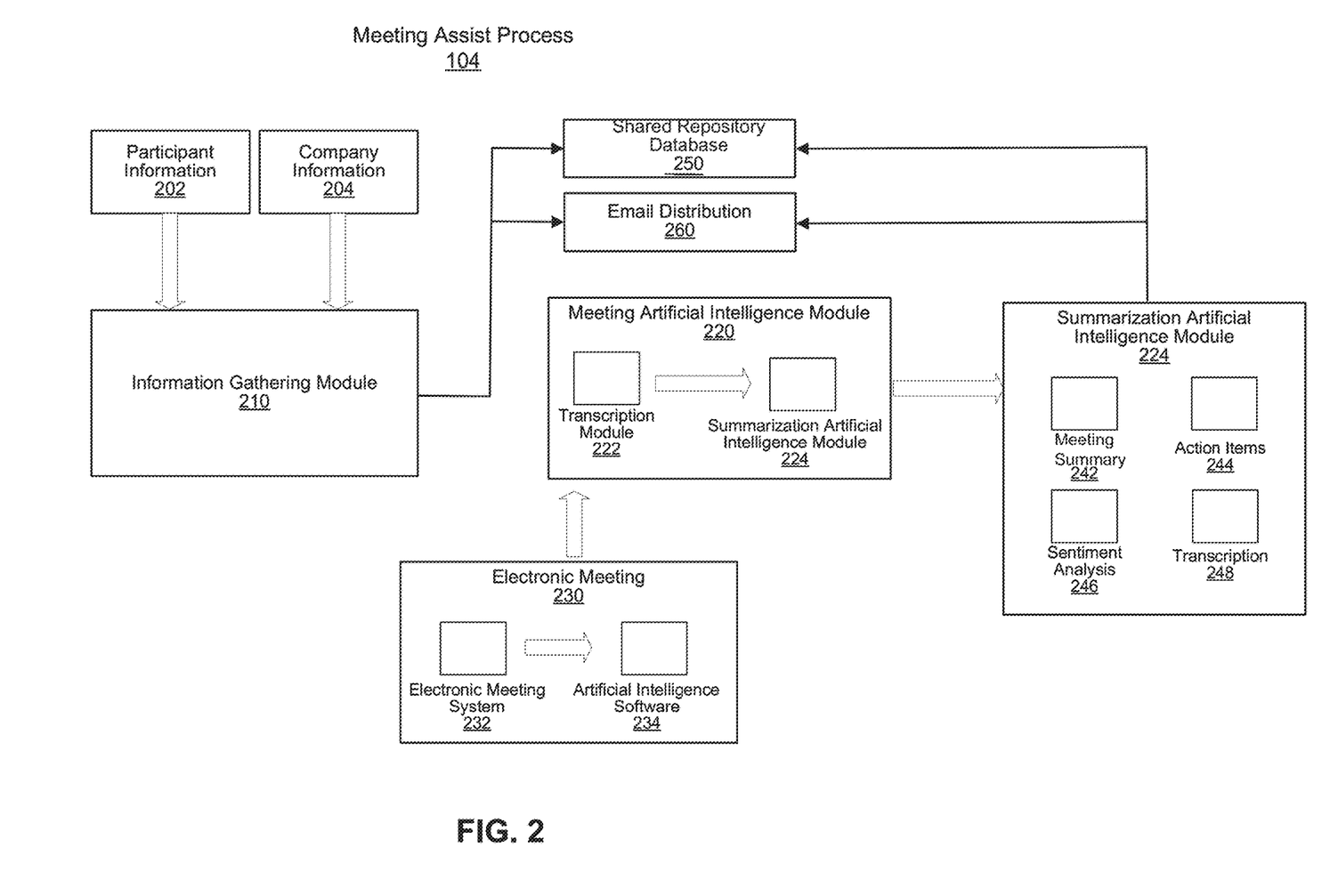
FIG. 2 is a block diagram that depicts meeting assist process according to an embodiment of the invention.

Referring now to FIG. 2, meeting assist process 104 depicts an architecture for assisting meetings by providing an approach that automates pre-meeting, contemporaneous meeting actions as well as post-meeting data management for an end-to-end meeting assistance solution.

In one embodiment, meeting assist process 104 applies to pre-meeting activities and initiates prior to a meeting in response to a request for a meeting and receiving meeting information at information gathering module 210. For example, if a meeting organizer initiates a meeting scheduling event on electronic meeting application 112, the information received may automatically initiate a meeting assist process. More particularly, once a request is detected, information gathering module 210 may generate a query based on the request to enable meeting assist process 104 to receive, over one or more communications networks, such as network infrastructure 106, a meeting request for meeting assistance.

The request may include meeting background information such as basic information, participant data, company data and the like. Meeting assist process 104 then instantiates information gathering module 210 to automatically parse the background information to form one or more queries for collecting data across a plurality of data sources to collect participant information 202 and company information 204. Thus, meeting assist process 104 may instantiate information gathering module 210 to perform internet web crawling, social media searching, customer relationship management searches and database searches and summarizes results for distribution.

The data sources may include computer readable media, internet sources, social media and business social media such as news feed sources, financial news and the like. Information gathering module 210 then queries the plurality of data sources to gather information based on the received request. For example, queries may include automatically connecting to LinkedIn™, social media sources, and news sources, and Dun and Bradstreet™ sources to retrieve additional data concerning topics and participants for a meeting. In one embodiment, information gathering module 210 may develop an information summary and/or an agenda based on the collected data and meeting information.

As shown, once the information is gathered, in one embodiment information may be provided to a shared repository 250 and/or emailed via email distribution 260. Once gathered information is collected and summarized, an information summary is distributed among participants 108, and a scheduled electronic meeting 230 may occur. In one embodiment, an organizer determines predetermined locations for distributing the gathered information, the predetermined locations including the shared repository database 250 and an email distribution list 260 including one or more participants.

Electronic meeting process 230 illustrates electronic meeting system 232 which may include one or more electronic meeting applications 112 operating on individual participants computers or devices such as node 104 shown in FIG. 1A-1C. According to an embodiment, electronic meeting 230 may operate with artificial intelligence software 234 such as a "bot" that may insert itself into the meeting which has the ability to record the meeting, and provide data to transcription module 222 to transcribe audio. Artificial intelligence software 234 may further identify key elements of a meeting or action items that occur during the meeting. Meeting artificial intelligence module 220 thus applies artificial intelligence to automatically transcribe the meeting and track meeting progress. For example, in one embodiment, meeting artificial intelligence module 220 compares an agenda for the meeting with the meeting progress and interacts with one or more participants. The interaction may include notifying participants of a time constraint or a missed agenda item. Other embodiments may include real-time interactions in response to sentiment analysis such as detecting that a tone of voice is negative and suggesting that an agenda item be moved to a later date.

In one embodiment, meeting artificial intelligence module 220 further includes a sentiment analysis module configured to scan one or more participants for sentiments expressed during the meeting, the sentiment analysis module applying facial recognition and voice analysis to determine a tone of voice of the one or more participants and a behavior analysis to determine a quality metric for the meeting.

Meeting artificial intelligence module 220 illustrates that data from electronic meeting 230 is provided to transcription module 222 and to summarization artificial intelligence module 224. More particularly, in one embodiment, during an electronic meeting 230, a transcription may automatically be prepared by meeting artificial intelligence module 220, which may supply data to summarization artificial intelligence module 224.

In one or more embodiments, meeting artificial intelligence module 220 monitors the meeting and applies artificial intelligence to automatically detect and track the meeting progress by analyzing the transcription created during electronic meeting 230.

In one or more embodiments, meeting assist process 104 automatically instantiates summarization artificial intelligence module 224 upon the meeting ending to generate a meeting analysis and action items. As shown, summarization artificial intelligence module 224 may further provide a meeting summary 242, generate action items 244, generate a sentiment analysis 246, and generate a summarized transcription 248.

Once summarization artificial intelligence module 224 generates a meeting analysis including one or more of the meeting summary, action items, transcription and sentiment analysis, the meeting assist process automatically distributes the meeting analysis to a shared repository database 250 and a predetermined email list such an email distribution 260. In one embodiment, one or more action items 244 may include automatically determining future agenda items based on the sentiment analysis and detected agenda items requiring further action due to time-limitations or the like.

Figure 3:
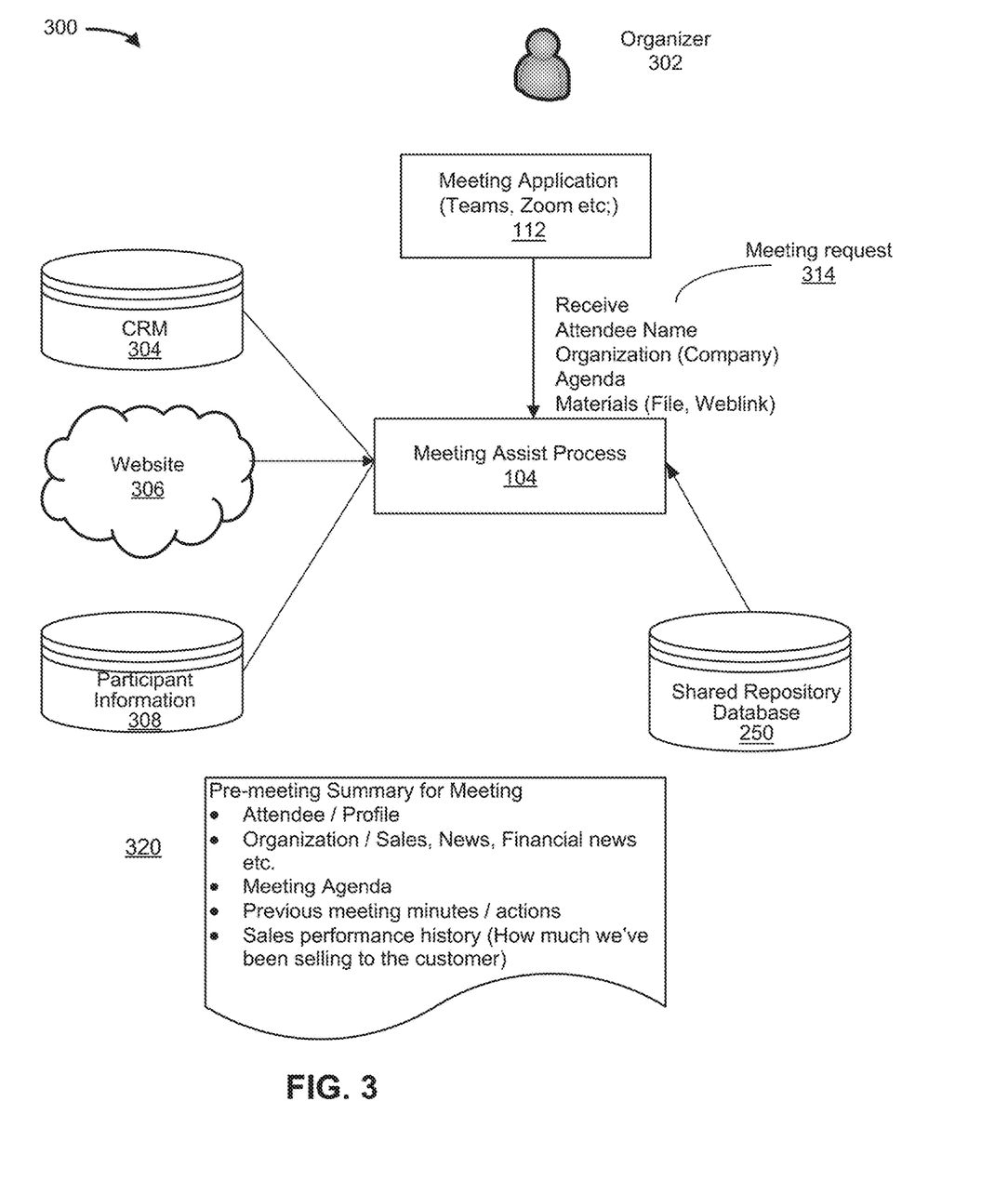
FIG. 3 is a block diagram that depicts pre-meeting details of the meeting assist process in accordance with an embodiment of the invention.

Referring now to FIG. 3, pre-meeting detailed flow diagram 300 illustrates a portion of the meeting assist process 104 wherein an organizer 302 initiates the process. More particularly, meeting assist process 104 is illustrated after receiving a meeting assistance request from organizer 302 including at least basic meeting information to enable a query for multiple data sources. For example, in one embodiment, a request may generate from a meeting application 112 such as Zoom™, Microsoft™ Teams™ or the like. Along with the meeting request, meeting information may include participant names, organization or company names, an agenda and materials such as a file or weblink or the like 314. The request may include meeting background information including data identifying one or more participants of the meeting, data identifying a topic of the meeting, an agenda for the meeting, and historical information regarding the meeting.

Based on the received meeting information, meeting assist process 104, via information gathering module 210, for example, may apply artificial intelligence, machine learning or the like to extract or parse the request data to determine participant names, company names and profiles, generate an agenda and determine a topic for the meeting based on the materials, files and websites associated with a weblink.

Using the extracted data, meeting assist process 104 may then automatically generate a query appropriate for performing a data search of a plurality of data sources. Exemplary data sources are illustrated as including customer relationship management (CRM) database 304 capable of providing sales performance history, past meeting minutes and actions, website 306 capable of providing company information such as sales, relevant news, financial news and the like, and participant information 308 which represents data profiles for any current and former participants. For example, based on an automated query, participant profile data may be pulled from the internet, social media, data stored in a shared repository database 250 and the like. For example, shared repository database 250 may include a previous action item from a prior meeting or a related meeting.

In one embodiment, if a participant has a common name, information gathering module may automatically verify data via profile characteristic data pulled from shared repository database 250 or mark such participant profile data as suspect due to an inability to verify according to an accuracy metric or the like. Shared repository database 250 may include data from a prior meeting providing further identifying characteristics of a participant to enable verifying data associated with a participant with a common name.

Once meeting assist process 104 receives the information based on the query, information gathering module 210 then generates a pre-meeting summary 320 for distribution. In accordance with one or more embodiments, pre-meeting summary 320 may include attendee and participant profiles, organizational data such as sales, news, financial news, a meeting agenda, previous meeting minutes and action items, and sales performance history. For example, if a sales meeting is being scheduled, sales performance history may include an amount that was sold to customers since the last meeting.

Figure 4:
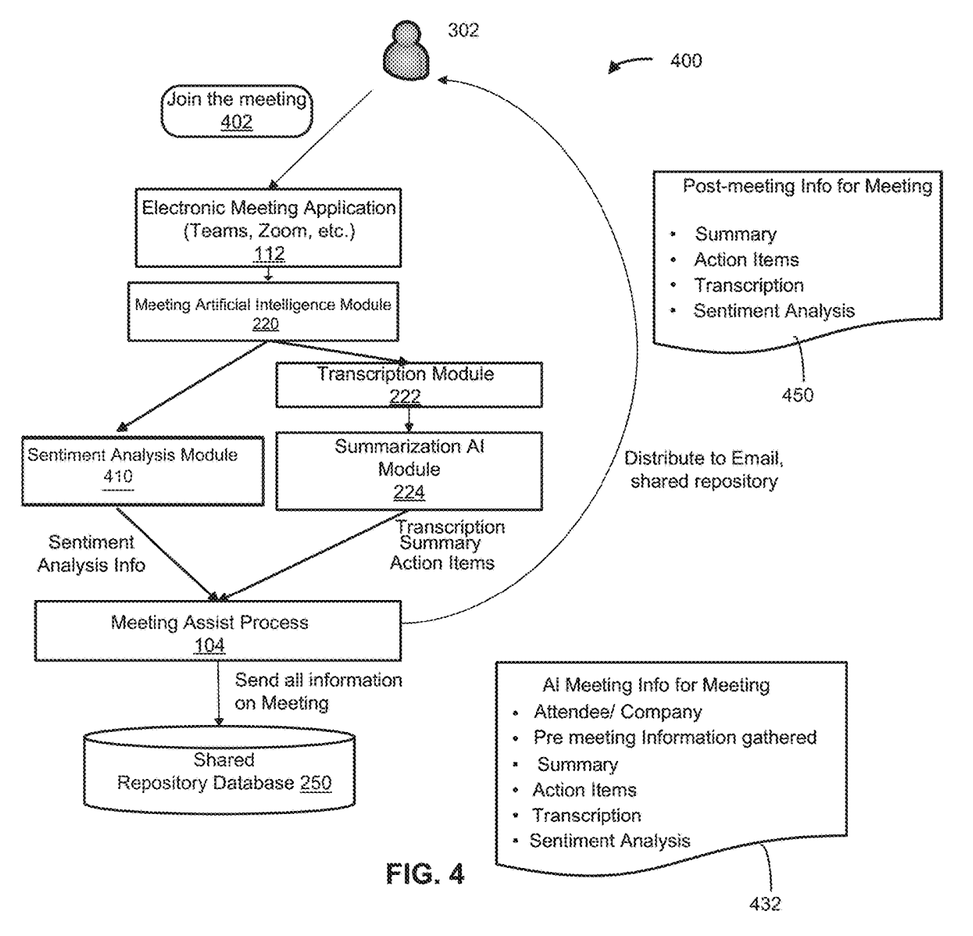
FIG. 4 is a flow diagram that depicts meeting and post-meeting details of the meeting assist process in accordance with an embodiment of the invention.

Referring now to FIG. 4, a meeting detailed flow diagram 400 illustrates meeting management and post-meeting management in accordance with one or more embodiments. As shown, organizer 302 may have already received meeting preparation information in accordance with FIG. 3 and received an indication to join a meeting 402. Organizer 302 may instantiate an electronic meeting application 112 such as Zoom™, Skype™, Cisco WebEx™, GoToMeetings™, or Microsoft™ Teams™ or the like. During the meeting, according to an embodiment, meeting artificial intelligence module 220, which may be implemented as an artificial intelligence software "bot" or other artificial intelligence or machine learning application inserts itself into electronic meeting application 112 as part of meeting assist process 104 to instantiate a plurality of modules such as sentiment analysis module, 410, transcription module 222, and summarization artificial intelligence module 224. Each module 410, 222 and 224 provides data to meeting assist process 104 including sentiment analysis information, transcription summary and action items and the like. Next, as part of meeting assist process 104, a summary of the information is provided to shared repository database 250.

As shown in FIG. 4, contents of shared repository database 250 is shown in block 432 as including information such as attendee/company such as each participant 108 information, pre-meeting information gathered, summary data, action items, a transcription and sentiment analysis.

Also shown in FIG. 4, according to an embodiment, contents of post-meeting distribution information 450 for a meeting may include a summary, action items, transcription and sentiment analysis such as that created by summarization artificial intelligence module 224. As shown, post-meeting distribution information 450 may then be distributed to both shared repository database 250 and to different emails. For example, some email distribution lists may be bifurcated into participants associated with a predetermined company and other email distribution lists may be associated with third parties. In one embodiment, the post-meeting distribution information may be separated so that personal data is not distributed to third parties. For example, sentiment analysis may focus on one or more participants that may or may not be associated with organizer 302. Such sentiment analysis may be restricted to organizer-related companies and participants.

Figure 5:
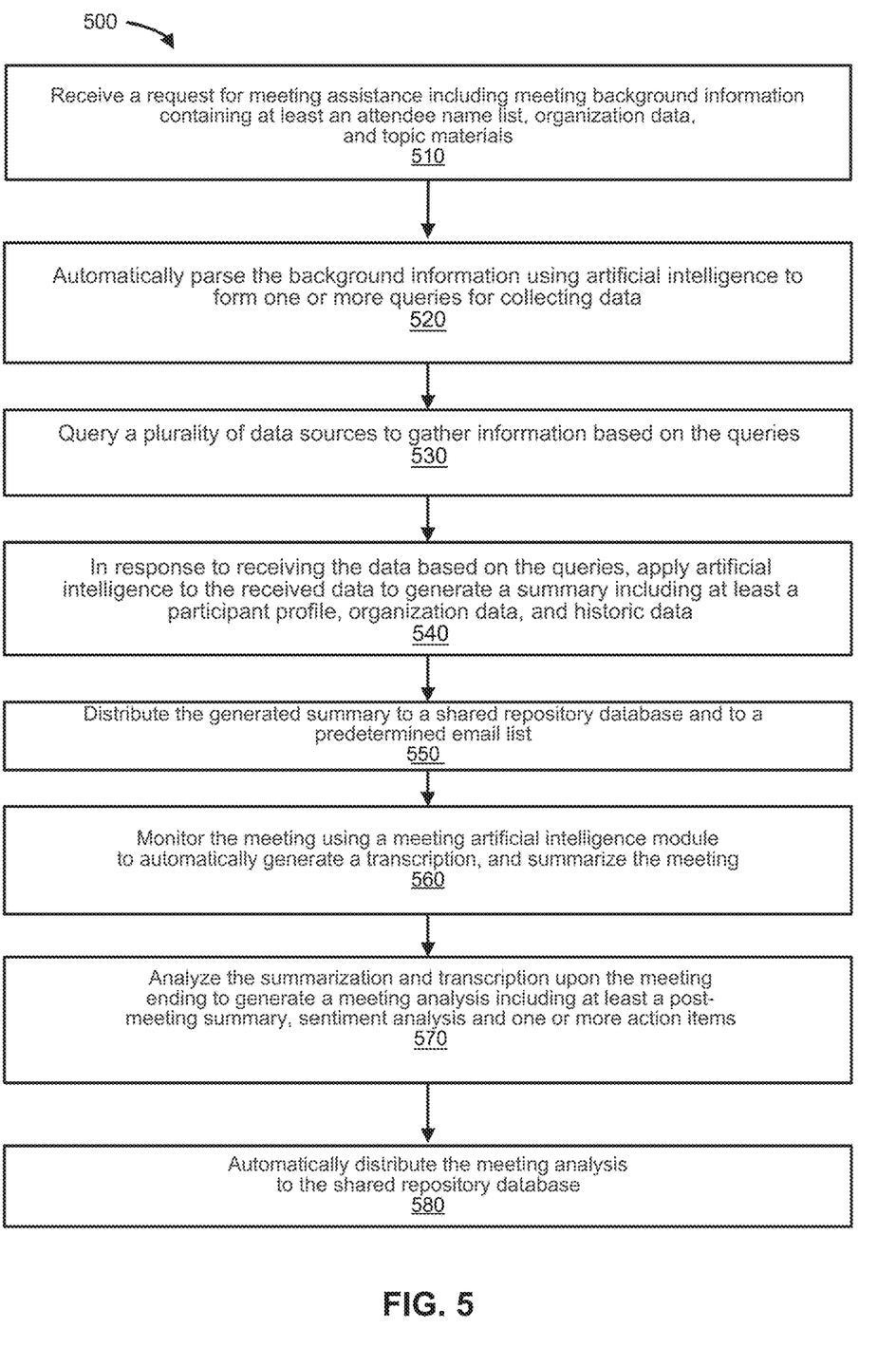
FIG. 5 is a flow diagram that depicts a method according to an embodiment of the invention.

Referring now to FIG. 5 a flow diagram illustrates a method in accordance with one or more embodiments. Block 510 provides for receiving a request for meeting assistance including meeting background information containing at least an attendee name list, organization data, and topic materials. For example, information gathering module 210 initiates a pre-meeting information gathering by first receiving a request for meeting assistance. Information gathering may then automatically take place based on meeting background information.

Block 520 provides for automatically parsing the background using artificial intelligence to form one or more queries for collecting data. For example, information gathering module 210 may automatically parse the background information to form one or more queries for collecting data. Further, information gathering module 210 may take any meeting information, such as former meeting information and parse the data to create search data.

Block 530 provides for querying a plurality of data sources to gather information. For example, as shown in FIG. 2, information gathering module 210 may gather participant information 202 and company information 204, and as shown in FIG. 3, meeting assist process 104 may search information from a CRM 304, website 306, and participant information 308.

Block 540 provides for applying artificial intelligence to the received data upon receiving the data based on the queries, to generate a summary including at least a participant profile, organization data and historic data. For example, based on the collected data, information gathering module 210 may generate a summary.

Block 550 provides for distributing the generated summary to a shared repository database and to a predetermined email list. For example, as shown in FIG. 2, information gathering module 210 my distribute a summary to a shared repository 250 and/or a predetermined email distribution list 260.

Block 560 provides for monitoring the meeting using a meeting artificial intelligence module to automatically generate a transcription and summarize the meeting. For example, FIG. 4 illustrates a summarization artificial intelligence module 224 and a transcription module 222 coupled to meeting artificial intelligence module 220 capable of monitoring the meeting and generating a transcription and summary.

Block 570 provides for analyzing the summarization and transcription upon the meeting ending to generate a meeting analysis including at least a post-meeting summary, sentiment analysis and one or more action items. For example, a summarization artificial intelligence module 224 may generate meeting analysis.

Block 580 provides for automatically distributing the meeting analysis to the shared repository database. For example, summarization artificial intelligence module 224 may automatically distribute the meeting analysis.

IV. Implementation Mechanisms.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
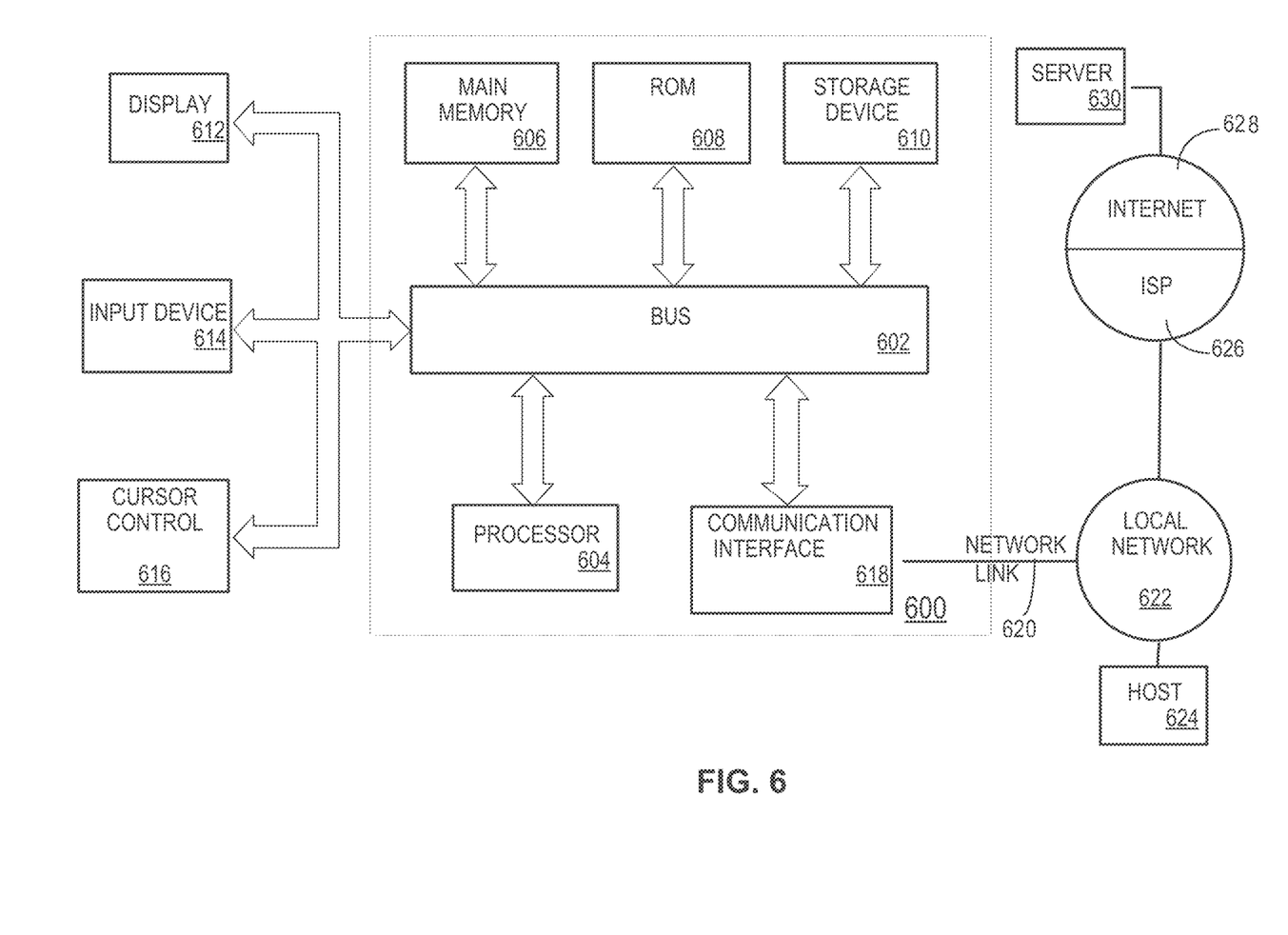
FIG. 6 is a block diagram of a computer system on which embodiments of the invention may be implemented.

FIG. 6 is a block diagram that depicts an example computer system 600 upon which embodiments of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. Although bus 602 is illustrated as a single bus, bus 602 may comprise one or more buses. For example, bus 602 may include without limitation a control bus by which processor 604 controls other devices within computer system 600, an address bus by which processor 604 specifies memory locations of instructions for execution, or any other type of bus for transferring data or signals between components of computer system 600.

An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic or computer software which, in combination with the computer system, causes or programs computer system 600 to be a special-purpose machine. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operate in a specific manner. In an embodiment implemented using computer system 600, various computer-readable media are involved, for example, in providing instructions to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors; and
   one or more memories storing instructions which, when processed by the one or more processors, cause:
   a meeting assist process executing on the apparatus to receive, over one or more communications networks, a meeting request for meeting assistance, the meeting request including meeting background information;
   prior to start of a meeting based on the meeting request, the meeting assist process executing on the apparatus to instantiate an information gathering module to:
   automatically parse the meeting background information to form one or more queries for collecting data across a plurality of data sources;
   query a plurality of data sources to gather information; and
   distribute the gathered information automatically to predetermined locations;
   the meeting assist process executing on the apparatus to instantiate a meeting artificial intelligence module to monitor the meeting and apply artificial intelligence to automatically detect meeting progress and track meeting progress;
   the meeting assist process executing on the apparatus to automatically instantiate a summarization artificial intelligence module upon the meeting ending to generate a meeting analysis including at least a post-meeting summary and sentiment analysis; and
   the meeting assist process executing on the apparatus to automatically distribute (1) the meeting analysis, with the sentiment analysis, to a shared repository database or a predetermined email list and (2) the meeting analysis, without the sentiment analysis, to a different shared repository database or a different predetermined email list.

2. The apparatus of claim 1, wherein the meeting background information includes two or more of: data identifying one or more intended participants of the meeting, data identifying a topic of the meeting, an agenda for the meeting, or historical information regarding the meeting.

3. The apparatus of claim 1, wherein the meeting request includes meeting background information from a meeting organizer who determines the predetermined locations, the predetermined locations including the shared repository database and an email distribution list including one or more intended participants of the meeting.

4. The apparatus of claim 1, wherein the meeting assist process executing on the apparatus instantiates the information gathering module to perform one or more of internet web crawling, social media searching, customer relationship management source searching, or database searching, and summarizing results of the crawling or searching for distribution.

5. The apparatus of claim 1, wherein the meeting artificial intelligence module applies artificial intelligence to automatically transcribe the meeting and track meeting progress including comparing an agenda for the meeting with the meeting progress and interacting with one or more participants of the meeting.

6. The apparatus of claim 1, wherein the meeting artificial intelligence module further includes a sentiment analysis module configured to scan one or more participants of the meeting for sentiments expressed during the meeting, the sentiment analysis module applying facial recognition and voice analysis to determine a tone of voice of the one or more participants and a behavior analysis to determine a quality metric for the meeting.

7. The apparatus of claim 1, wherein the summarization artificial intelligence module upon the meeting ending further generates one or more action items.

8. The apparatus of claim 7, wherein the one or more action items include automatically determining future agenda items based on the sentiment analysis and detected agenda items requiring further action due to time limitations.

9. One or more non-transitory computer-readable media storing instructions which, when processed by one or more processors, cause:
   a meeting assist process to receive, over one or more communications networks, a meeting request for meeting assistance, the meeting request including meeting background information;
   the meeting assist process to instantiate an information gathering module to:
   automatically parse the meeting background information to form one or more queries for collecting data across a plurality of data sources;
   query a plurality of data sources to gather information; and
   distribute the gathered information automatically to predetermined locations;
   the meeting assist process to instantiate a meeting artificial intelligence module to monitor the meeting and apply artificial intelligence to automatically detect meeting progress and track meeting progress;
   the meeting assist process to automatically instantiate a summarization artificial intelligence module upon the meeting ending to generate a meeting analysis including at least a post-meeting summary and sentiment analysis; and
   the meeting assist process executing on the apparatus to automatically distribute (1) the meeting analysis, with the sentiment analysis, to a shared repository database or a predetermined email list and (2) the meeting analysis, without the sentiment analysis, to a different shared repository database or a different predetermined email list.

10. The one or more non-transitory computer-readable media of claim 9, wherein the meeting background information includes two or more of: data identifying one or more intended participants of the meeting, data identifying a topic of the meeting, an agenda for the meeting, or historical information regarding the meeting.

11. The one or more non-transitory computer-readable media of claim 9, wherein the meeting request includes meeting background information from a meeting organizer who determines the predetermined locations, the predetermined locations including the shared repository database and an email distribution list including one or more intended participants of the meeting.

12. The one or more non-transitory computer-readable media of claim 9, wherein the one or more non-transitory computer-readable media store additional instructions which, when processed by the one or more processors, cause the meeting assist process to instantiate the information gathering module to perform one or more of internet web crawling, social media searching, customer relationship management source searching, or database searching, summarizing results of the crawling or searching for distribution.

13. The one or more non-transitory computer-readable media of claim 9, wherein the summarization artificial intelligence module upon the meeting ending further generates one or more action items.

14. The one or more non-transitory computer-readable media of claim 13, wherein the one or more action items include automatically determining future agenda items based on the sentiment analysis and detected agenda items requiring further action due to time limitations.

15. A computer-implemented method for automated meeting assistance for a meeting, the computer-implemented method comprising:
   receiving a request for meeting assistance including meeting background information;
   prior to starting the meeting based on the request:
      automatically parsing the meeting background information to form one or more queries for collecting data;
      querying a plurality of data sources to gather information based on the one or more queries;
      in response to receiving the data based on the one or more queries, applying artificial intelligence to the received data to generate a summary including at least a participant profile, organization data, and historic data; and
      distributing the summary to a shared repository database or to a predetermined email list;
   after the meeting begins:
      generating a meeting analysis including at least a post-meeting summary and sentiment analysis; and
      automatically distributing (1) the meeting analysis, with the sentiment analysis, to a shared repository database or a predetermined email list and (2) the meeting analysis, without the sentiment analysis, to a different shared repository database or a different predetermined email list.

16. The computer-implemented method of claim 15, wherein the querying the plurality of data sources further comprises:
   performing two or more of internet web crawling, social media searching, computer readable media searching, or database searching based on the meeting background information, wherein the meeting background information includes at least a name list, organization data, and topic material.

17. The method of claim 15, further comprising:
   during the meeting, comparing an agenda for the meeting with progress of the meeting and interacting with one or more participants of the meeting.

18. The method of claim 17, wherein interacting with the one or more participants of the meeting comprises:
   notifying participants of a time constraint or a missed agenda item.

19. The method of claim 15, further comprising:
   during the meeting, detecting that a tone of a voice of a participant of the meeting is negative;
   in response to the detecting, suggesting that an agenda item of the meeting be moved to a later date.

* * * * *